(12) United States Patent
Yu et al.

(10) Patent No.: US 7,046,729 B2
(45) Date of Patent: May 16, 2006

(54) BIT RATE CONTROL FOR MOTION COMPENSATED VIDEO COMPRESSION SYSTEM

(75) Inventors: Siu-Leong Yu, San Jose, CA (US); Yi Liu, San Ramon, CA (US)

(73) Assignee: ESS Technology, Inc., Fremont, CA (US)

( * ) Notice: Subject to any disclaimer, the term of this patent is extended or adjusted under 35 U.S.C. 154(b) by 0 days.

(21) Appl. No.: 10/229,768

(22) Filed: Aug. 27, 2002

(65) Prior Publication Data

US 2004/0042548 A1    Mar. 4, 2004

(51) Int. Cl.
*H04N 7/12*    (2006.01)

(52) U.S. Cl. ................................... 375/240.12
(58) Field of Classification Search .............. 348/700; 375/240, 240.02–240.07, 246.12–240.16, 375/240.24, 240.25; H04N 7/12
See application file for complete search history.

(56) References Cited

U.S. PATENT DOCUMENTS

| | | | |
|---|---|---|---|
| 5,032,905 A | 7/1991 | Koga | |
| 5,506,686 A | 4/1996 | Auyeung et al. | |
| 5,532,746 A | 7/1996 | Chang | |
| 5,544,263 A | 8/1996 | Iwamura | |
| 5,617,150 A | 4/1997 | Nam et al. | |
| 6,057,893 A * | 5/2000 | Kojima et al. | 348/700 |
| 6,097,757 A * | 8/2000 | Boice et al. | 375/240 |
| 6,347,117 B1 * | 2/2002 | Kato et al. | 375/240.05 |
| 6,393,054 B1 * | 5/2002 | Altunbasak et al. | 375/240 |
| 6,434,196 B1 * | 8/2002 | Sethuraman et al. | 375/240.12 |
| 6,449,392 B1 * | 9/2002 | Divakaran et al. | 375/240.25 |
| 6,546,051 B1 * | 4/2003 | Ramaswamy | 375/240.03 |
| 2002/0168007 A1 * | 11/2002 | Lee | 375/240.03 |

* cited by examiner

*Primary Examiner*—Richard Lee
(74) *Attorney, Agent, or Firm*—Farjami & Farjami LLP

(57) ABSTRACT

A portion of the number of bits initially allocated for encoding some of the frames of a group of pictures (GOP) is accumulated in a bit bank and is subsequently used to encode other frames that may require a larger number of bits to encode than those initially allocated for these frames. Furthermore, when a scene change P frame is detected in a first GOP, a second GOP is formed. The second GOP includes the scene change P frame as well as the remaining unencoded frames of the original GOP. The P frame of the first GOP is changed to an I frame in the second GOP. Furthermore, the frame to be displayed after the I frame of the second GOP is also changed to a duplicate of the I frame of the second GOP.

20 Claims, 2 Drawing Sheets

BIT RATE CONTROL FOR MOTION COMPENSATED VIDEO COMPRESSION SYSTEM

BACKGROUND OF THE INVENTION

The present invention relates to processing of video data, and more particularly to control of bit rates in encoding video data Controlling the bit rate for encoding of video data is important and affects the quality of the video data. An effective bit rate control technique (alternatively referred to hereinbelow as rate control) allocates more bits for encoding more complex regions of a video frame. For a discrete cosine transform (DCT) based system, the bit rate control typically adjusts the quantization scale of the DCT coefficients to regulate the bit rate. When a lower rate is desired, the quantization scale is increased. Conversely, when a higher rate is desired, the quantization scale is decreased.

A well-known rate control algorithm called Test Model 5 (TM5) has been developed in connection with the MPEG-2 standard (Test Model Editing Committee: "Test Model 5"; ISO/IEC JTC/SC29/WG11/N400, April 1993). The TM5 algorithm maintains a constant bit rate for each group of pictures (GOP). A GOP often includes three types of frames, namely I, P and B frames.

Bit rate control in the TM-5 Standard involves three steps. During the first step, commonly referred to as frame level rate control step, the number of bits available to code the next frame is estimated. During the second step, commonly referred to as macro block level rate control step, the reference value of the quantization parameter for each macro block is set by means of a virtual buffer. During the third step, commonly referred to as the adaptive quantization step, the reference value of the quantization parameter set during the second step modified in accordance with the spatial activity measurement of the macro block. The modified reference value of the quantization parameter is subsequently used in the quantization process. A more detailed description of each of the above three steps follows.

Frame Level Rate Control

Frame level rate control is adapted to allocate bits among frames according to their complexity. In accordance with the frame level rate control, more bits are used to encode more complex frames while at the same time the average number of bits per second is maintained close to a given bit rate. Assume that bit_rate and picture_rate respectively represent the bit rate in bits/sec and the frame rate in frames/sec for encoding a video sequence. For simplicity, bit allocation is performed for a GOP. Assume fuller that there are N pictures in the GOP, i.e., the period of I frames in the video sequence equals to N. The total number of bits for encoding this GOP is equal to the product of N and the average number of bits used for encoding each frame.

In accordance with the frame level rate control, these total number of bits is distributed among the frames of the GOP such that all the bits are consumed for encoding of the GOP. For simplicity, this distribution is adaptively adjusted after encoding a frame. More specifically, after a frame is encoded, a target number of bits for encoding the next frame of the same frame type is determined by taking into account the complexity of the last encoded frame and using the remaining unused bits.

Complexity Estimation

Assume $X_i$, $X_p$, and $X_b$ represent global complexity measurement for I, P and B frame types respectively. After a frame is encoded, the corresponding global complexity measurements are computed as shown below:

$$X_i = S_i \times avg\_Q_i$$
$$X_p = S_p \times avg\_Q_p \quad (1.1)$$
$$X_b = S_b \times avg\_Q_b$$

where $S_i$, $S_p$ or $S_b$ respectively represent the number of bits generated for encoding of I, P and B frames that were last encoded. The average quantization parameters avg_$Q_i$, avg_$Q_p$ and avg_$Q_b$ are the average of the quantization parameter QP for all the macro blocks (rounded to an integer) used during encoding the I, P or B frames respectively—this average also includes the quantization parameter for skipped macro blocks. The initial values of $X_i$, $X_p$, and $X_b$ are set as follows.

$$X_i = (160 \times bit\_rate)/115 + 0.5$$
$$X_p = (60 \times bit\_rate)/115 + 0.5 \quad (1.2)$$
$$X_b = (42 \times bit\_rate)/115 + 0.5$$

Target Number of Bits

In the TM5 standard, the target number of bits for the next I, P or B frame of a GOP, respectively represented as $T_{itm5}$, $T_{ptm5}$, or $T_{btm}$ are computed as shown below:

$$T_{itm5} = \max\{R/(1+N_p \times X_p/(K_p \times X_i) + N_b \times X_b/(K_b \times X_i)) + 0 5, T\min\}$$

$$T_{ptm5} = \max\{R/(N_p + N_b \times K_p \times X_b/(K_b \times X_p)) + 0 5, T\min\} \quad (1.3)$$

$$T_{btm5} = \max\{R/(N_b + N_p \times K_b \times X_p/(K_p \times X_h)) + 0 5, T\min\}$$

Variables $N_p$ and $N_b$ are respectively the number of P and B frames of a current GOP that are yet to be encoded (hereinafter alternatively referred to as the remaining frames). The minimum target number of bits $T_{min}$ is defined as:

$$T_{min} = bit\_rate/(8 \times picture\_rate) + 0 5 \quad (1.4)$$

where $K_p$ and $K_b$ are universal constants and depend on quantization matrices. For the matrices specified in MPEG-4, $K_p = 1.0$ and $K_b = 1.4$. R is the remaining number of bits assigned to the GOP and is updated after a frame is encoded in accordance with the following expression:

$$R = R - S_{i,p,b} \quad (1.5)$$

In the above expression (1.5), $S_{i,p,b}$ is the number of bits used to encode the last frame (hereinafter referred to alternatively as the just encoded frame). Furthermore, the R on the left side is the number of bits remaining immediately after the last frame is encoded, and the R on the right is the number of bits remaining immediately before the last frame is encoded. R is set to 0 at the beginning of a new video sequence. However, prior to encoding the first frame, i.e., the I-frame of a new GOP, R is set to the following value:

$$R = R + bit\_rate \times N/picture\_rate + 0.5 \quad (1.6)$$

Macro Block Level Rate Control

During the macro block level rate control step, the reference value of the quantization parameter for each macro block is determined by means of a virtual buffer-. The TM5 uses virtual buffer parameters $d_i$, $d_p$, and $d_b$ for the corresponding frame types to regulate bit rates. Upon allocation of the target bit rate $t_i$, $t_p$, and $t_b$, for each frame, the virtual buffer capacity is updated for each macro block. Next, a quantization parameter for the macro block is computed. In the TM5, the quantization parameter can be modified according to an activity measure of the macro block to achieve better picture quality. Consequently, the TM5 standard uses the quantization parameter directly to control the bit rate. This quantization parameter is derived from the bit rate allocated to each corresponding frame. Thus, changing the target frame rate will impact the quantization parameter and consequently manifest itself in a picture quality variation.

Virtual Buffers

For each I, P or B frame, the rate control in the macro block level is achieved by changing a quantization parameter and according to the fullness of a corresponding virtual buffer. Assume $Q_j$ is the reference quantization parameter of the j-th macro block, and $d_j$ is a measure of the fullness of the virtual buffer. The reference quantization parameter is computed as shown below:

$$Q_j = d_j \times (31/r) \quad (2.1)$$

Note that $Q_j$ is further modified according to the macro block activity—described further below—before it is applied to quantization. In the above equation (2.1) r is a reaction parameter defined by:

$$r = 2 \times bit\_rate/picture\_rate \quad (2.2)$$

Assume $d^i_j$, $d^p_j$ and $d^b_j$ respectively represent the buffer fullness for each of frame types I, P and B respectively. Assume further that MB_cnt represents the number of macro blocks in a frame. Consequently, before encoding the j-th macro block (j is greater than or equal to zero), the corresponding buffer fullness parameters are calculated as shown below:

$$d^i_j = d^i_0 + B_{j-1} - j \times TM_i$$

$$d^p_j = d^p_0 + B_{j-1} - j \times TM_p \quad (2.3)$$

$$d^b_j = d^b_0 + B_{j-1} - j \times TM_b$$

In equations (2.3), $B_j$ is the number of bits used in encoding all the macro blocks in the frame up to the j-th macro block, and $B_{-1}$ is set to 0. If the values of $d^i_j$, $d^p_j$, or $d^b_j$ in the equation (2.3) are negative, they are set to zero.

In the $TM_5$, the target number of bits per macro block $TM_i$, $TM_p$, and $TM_b$ is defined as:

$$TM_i = T_i/MB\_cnt$$

$$TM_p = T_p/MB\_cnt \quad (2.4)$$

$$TM_b = T_b/MB\_cnt$$

Furthermore, in equations (2.3), $d^i_0$, $d^p_0$ and $d^b_0$ represent the initial buffer fullness for each of I, P and B frame types respectively. The default values of $d^i_0$, $d^p_0$, and $d^b_0$ are:

$$d^i_0 = 15 \times r/31$$

$$d^p_0 = K_p \times d^i_0 \quad (2.5)$$

$$d^b_0 = K_b \times d^i_0$$

At the beginning of encoding a video sequence, the initial buffer fullness parameters are set to their corresponding default values in accordance with their frame types. After encoding the last macro block of a frame, the default values are updated as shown below:

$$d^{i,p,b}_0 = d^{i,p,b}_0 + S_{i,p,b} - T_{i,p,b} \quad (2.6)$$

where $S_{i,p,b}$ is the total number of bits used in encoding of the frame, $T_{i,p,b}$ is the target number of bits for the corresponding frame type (see equations (2.3)). The updated initial buffer fullness values are used to encode the next frame of the same frame type. If $d^{i,p,b}_0$ as determined by expression (2.6) yields a negative value, the default initial values as shown in expressions (2.5) are used.

Adaptive Quantization

During the adaptive quantization step, the reference value of the quantization parameter set during the macro level rate control step is modified in accordance with the level of the activity of the macro blocks. Assume $act_j$ is the measure of spatial activity for the j-th macro block of a frame. As seen below, $act_j$ is calculated from four luminance frame-organized sub-blocks (n=1.4), and four luminance field-organized sub-blocks (n=5.) using the original intra pixel values:

$$act_j = 1 + \min\{vblk_1, vblk_2, \ldots, vblk_8\} \quad (3.1)$$

where the approximated variance is defined as:

$$vblk_n = (1/64) \times \Sigma^{64}_{k=1} |P^n_k - P\_mean_n| \quad (3.2)$$

and where:

$$P\_mean_n = (1/64) \times \Sigma^{64}_{k=1} P^n_k \quad (3.3)$$

In equation (3.3), $P^n_k$ is the intensity value of the k-th pixel in the n-th 8×8 block.

Assume avg_act is the average value of $act_j$ for all macro blocks in the just encoded frame. For the first frame, variable avg_act is typically set to 400. The normalized activity measure is defined as:

$$N\_act_j = (2 \times act_j + avg\_act)/(act_j + 2 \times avg\_act) \quad (3.4)$$

The quantization parameter for the $j^{th}$ macro block $mquant_j$ is obtained by multiplying the reference quantization parameter $Q_j$ with the normalized activity measure $N\_act_j$, as shown below:

$$mquant_j = Q_j \times N\_act_j + 0.5 \quad (3.5)$$

The value of $mquant_j$ is maintained between 1 through 31, as known in the art.

While the TM5 algorithm works reasonably well in general, it does not offer any special treatment for the case of a scene change, in which the bit rate required for the frame is larger than the allocated bit rate. First, the predictive coding mode might not be suitable for the scene changed frame since the motion-compensated frame differences can consume more bits than the original frame.

U.S. Pat. No. 5,032,905, entitled "Accurate Detection of a Drastic Change between Successive Pictures", suggests an intra-mode for the scene change frame. Whether this scene change frame is coded in inter-mode or intra-mode, it will consume many more bits than a typical predictive frame. However, the normal TM5 algorithm cannot afford this bit rate budget because the target bit rate allocated to a P-frame is much less than that allocated to an I-frame. With such a the bit rate constraint, the picture quality of this scene change P-frame will suffer badly. Consequently, all remaining frame in the GOP will be subject to poor quality. If the scene change occurs in the early portion of a GOP, the quality degradation will be very noticeable.

U.S. Pat. No. 5,617,150, entitled "Video Bit Rate Control Method," describes a method that attempts to alleviate the problem by "borrowing" bits from previous frames for a scene change P-frame. The encoding is performed in a delayed fashion. The target bit rate assigned to a current sub-GOP (an I-frame or a P-frame and its preceding B-frames) is delayed until the scene change detection for the following sub-GOP is completed. If a scene change is detected in the following sub-GOP, the target bit rate for the current sub-GOP is reduced so that more bits can be used for the scene changed frame. Otherwise, the target bit rate for the current sub-GOP is not modified. The "borrowing" of bits is limited to the sub-GOP immediately preceding the current sub-GOP, and the amount that can be borrowed is very limited. Also, the amount of quality improvement is also thus limited. Furthermore, this method introduces an additional delay that is proportional to the number of frames in a sub-GOP.

Thus, there is a need for an improved method of encoding a sequence of video frames that is adapted to reduce picture quality degradation when the bit rate allocated for encoding of the sequence of frames falls below a predicted value.

SUMMARY OF THE INVENTION

In accordance with one aspect of the present invention, a portion of the number of bits initially allocated for encoding some of the frames of a video sequence is set aside in a bit bank and thus is not used to encode these frames. The bits so accumulated in the bit bank are subsequently used to encode, for example, a frame that includes a scene change and thus may require a larger number of bits to encode than that initially allocated for that frame. In one embodiment, the number of bits accumulated in the bit bank for each of the I, P and B frames is defined by one or more threshold values that are programmable and are adapted to change dynamically.

In accordance with another aspect of the present invention, some or all of the bits accumulated in the bit bank as well as any remaining allocated bits are used to encode the remaining frames of the GOP. Furthermore, when a scene change P frame is detected, a new GOP is formed. The new GOP includes the scene change P frame of the original GOP and the remaining unencoded frames of the original GOP. The P frame of the original GOP is changed to an I frame in the new GOP. In the new GOP, the frame to be displayed after the I frame is also changed to a duplicate of the P frame of the original GOP and is encoded as a P frame, thereby enabling all macro blocks of this duplicate frame to be encoded in the skipped mode.

In accordance with yet another aspect of the present invention, an upper and a lower limit is set for the target bit rates associated with each of the I, P and B frames to improve efficiency. Moreover, the reaction parameter as defined in the $TM_5$ standard, is adapted to depend on the frame resolution. Accordingly, the reaction parameter increases or decreases depending on the relationship between the bit rate and the resolution of the frame.

In accordance with another aspect of the present invention, to improve video quality a non-negative lower limit is set for each of the initial buffer fullness parameters. Furthermore, to reduce motion artifacts, the summed absolute difference calculated in connection with the motion estimation of a macro block is used to adjust the value of the quantization parameter for the P and B frames of a GOP.

These and other embodiments of the present invention achieve their purposes and benefits in the context of known circuit and process technology and known techniques in the electronic and process arts. Other features and advantages of the present invention will become apparent upon consideration of the following detailed description, accompanying drawings, and appended claims.

DETAILED DESCRIPTION OF THE INVENTION

Figure 1A:
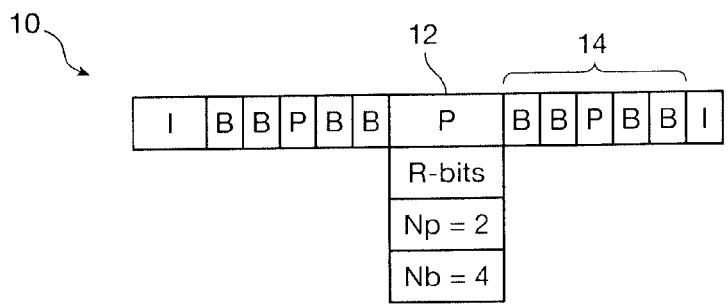
FIGS. 1A and 1B respectively show frames of a GOP before and after detection of a scene change, in accordance with one aspect of the present invention.

In accordance with one aspect of the present invention, a portion of the bit rate targeted for encoding of a current frame is set aside for encoding of a future frame for which the targeted bit rate may not be sufficient. This may occur when the future frame includes, for example, a scene change. In accordance with another aspect of the present invention, when a scene change P frame is detected, a new GOP is formed. The new GOP includes the scene change P frame of the original GOP and the remaining unencoded frames of the original GOP. The P frame of the original GOP is changed to an I frame in the new GOP. In the new GOP, the frame to be displayed after the I frame is also changed to a duplicate of the scene change P frame of the original GOP and is encoded as a P frame, thereby enabling all macro blocks of this duplicate frame to be encoded in the skipped mode. The target bit rate for the new GOP is dependent on the overall target bit rate and the number of frames forming the new GOP. In accordance with yet another aspect of the present invention, improved global complexity measures are provided to enhance frame level rate control.

Bit Bank

In accordance with one aspect of the present invention, a portion of the bits targeted for encoding of a frame that does not include a scene change is set aside (i.e., accumulated) in a bit bank and thus is not used in encoding that frame. The accumulation of bits in the bit bank continues until a programmable threshold limit is reached The bits so accumulated in the bit bank are thereafter used to encode a future frame when the number of bits initially targeted for encoding the future frame may yield inadequate video quality. For example, when a scene change occurs, some of the accumulated bits are added to the targeted bits to encode the scene change frame of a GOP. The bits accumulated in the bit bank are also used to encode the remaining unencoded frames of the GOP in which the scene change frame is disposed.

In the following it is understood that variables SavedBits and BankLimit respectively represent the number of accumulated bits in the bit bank and the threshold limit above which bits are no longer accumulated. For a GOP, variable BankLimit is defined as:

$$\text{BankLimit} = 3 \times ux \times \text{frame\_rate}/4 \qquad (4.1)$$

where ux is the minimal bits size unit and is described further below. Therefore, in accordance with one embodiment the present invention, the target number of bits $T_i$, $T_p$ and $T_b$ for encoding each of I, P or B frame is as follows:

```
if (SavedBits < BankLimit) {
        T_i = T_itm5 × 0.9,
        T_p = T_ptm5 × 0.95,
    or  T_b = T_btm5 × 0.98;
}
else{
        T_i = T_itm5,
        T_p = T_ptm5,
    or  T_b = T_btm5;
}
```
(4.2)

where $T_{itm5}$, $T_{ptm5}$ and $T_{btm5}$ are the target number of bits for encoding each of I, P and B frames in conformity with the $TM_5$ standard (see equations (1.3)). Accordingly, in this embodiment, 90% of the bits targeted for encoding an I frame is used to encode the I frame and the remaining 10% of the bits are accumulated in the bit bank. Similarly, 95% of the bits targeted for encoding a P frame is used to encode the P frame and the remaining 5% of the bits are accumulated in the bit bank. In a similar manner, 98% of the bits targeted for encoding a B frame is used to encode the B frame and the remaining 2% of the bits are accumulated in the bit bank.

After a frame is encoded, variable SavedBits is updated as shown below:

$$\text{delta} = T_{itm5,ptm5,btm5} - S_{i,p,b};$$ (4.3)

$$\text{SavedBits} += \text{delta};$$ (4.4)

where delta represents the number of bits accumulated in the bit bank in connection with the last encoded frame. In other words, delta is the number of bits that are allocated but are not used in encoding the last frame.

After a frame is encoded, the remaining number of bits R targeted for encoding the remaining frames of a GOP is determined as shown below:

```
if(SavedBits<BankLimit)
    R = R - T_itm5,ptm5,btm5
else
    R = R - S_i,p,b;
if ( R < T_min) {
    if(R > 0)
        SavedBits += R,
    R= (2 ×N_p + N_b) × ux;
    SavedBits -=R;
}
```
(4.5)

A negative variable SavedBits indicates that future bits are to be borrowed to encode the remaining frames of the GOP. After all the frames of a GOP are encoded, any remaining bits R are added to the SavedBits if the SavedBits is below the BankLimit, as shown below:

```
If(SavedBits<BankLimit){
    SavedBits+=R,
    R = 0;
}
R = R + bit_rate × N/picture_rate +0.5
```
(4.6)

The bit bank also operates across GOP boundaries. In other words, bits accumulated in the bit bank after encoding a first GOP may be used to encode subsequent GOPs, as described further below.

Forming a New GOP After a Scene Change

In accordance with another aspect of the present invention, when a scene change frame is detected, some or all of the bits accumulated in the bit bank as well as any allocated bits remaining are used to encode the remaining frames of the GOP. Furthermore, a new GOP is formed.

Since a B frame is encoded after a P frame and the scene change frame does not affect the video quality of an I frame, scene change detection is performed only for P frames. Thus, in accordance with the present invention, when a P frame of a current GOP is detected to include a scene change—resulting in flag Scene_change parameter to be set to 1—the P frame and the rest of the frames in the current GOP form a new GOP. Therefore, the P frame of the current GOP is changed to an I frame in the new GOP. The total number of frames in the new GOP is equal to $(N_p+N_b)$, where $N_p$ and $N_b$ are the number of P and B frames left in the current GOP respectively. The parameters $N_p$ and $N_b$ are updated to indicate the number of P frames and B frames of the new GOP.

Figure 1B:
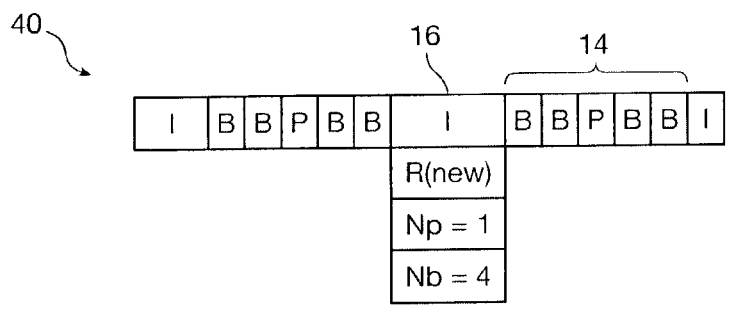

FIG. 1A is a diagram showing the frames of a GOP 10. GOP 10 is shown as having 12 frames, namely one I frame, eighth B frames and two P frames. The seventh frame of GOP 10, P frame 12 is assumed to contain a scene change. Accordingly, a new GOP 40 whose I frame 16 is the same as the P frame 12 of GOP 10 is formed, as shown in FIG. 1B. GOP 40 also includes the remaining unencoded frames of GOP 10, which are collectively shown to in FIGS. 1A and 1B with reference numeral 14.

Coding a Frame After the Scene-change Frame as a Duplicated Frame

Since a scene change frame is not detected until the P frame containing the scene change is substantially encoded, re-encoding this P frame as an I frame may create difficulties for the associated hardware. To overcome this problem, in addition to changing the P frame of the current GOP to an I frame in the new GOP, the frame to be displayed after the I frame of the new GOP is also changed to be identical to (i.e., to be a duplicate of) the scene change P frame of the current GOP. In this manner, all macro blocks of this duplicate frame are encoded in the skipped mode thus enabling the encoded bits to be pre-computed and stored in a memory. Because encoding of this duplicate skipped frame requires relatively shorter time, any time so saved may be used for encoding the I frame of the new GOP. As known to those skilled in the art, an I-frame often typically requires more bits to encode than a P frame.

Figure 2A:
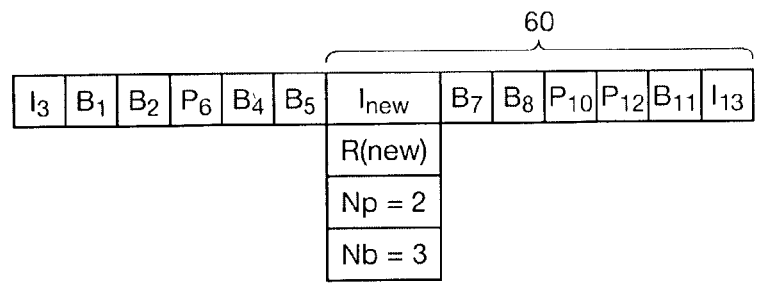
FIG. 2A shows frames of a GOP after detection of a scene change but prior to formation of a second duplicate frame.
Figure 2B:
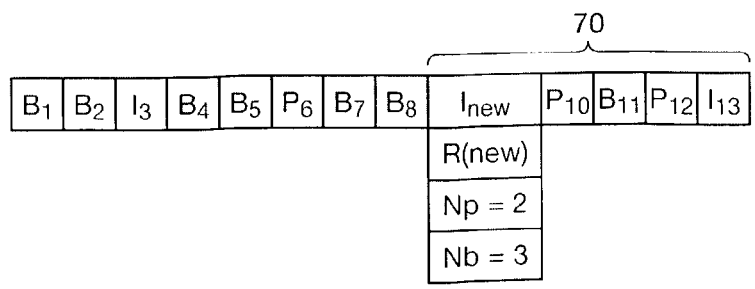
FIG. 2B shows the frames of the GOP of FIG. 2A after the formation of the second duplicate frame.

FIG. 2A illustrates an exemplary GOP 60 formed after detection of a scene change and prior to formation of a duplicate frame, as described above. As seen from FIG. 2A, $I_{new}$ is the I frame of GOP 60. Frames shown in FIG. 2A are in encoding order and not in display order. Frames $B_7$ and $B_8$ are displayed before frame $I_{new}$ and frame $P_{10}$ is displayed after frame $I_{new}$. Therefore, frame $P_{10}$ is changed to a duplicate of frame $I_{new}$. GOP 70, shown in FIG. 2B shows the frames of GOP 60 after frame $P_{10}$ is changed to a duplicate of frame $I_{new}$.

After forming a new GOP and after changing the frame that is to be displayed after the scene change frame to a duplicate of the scene change frame, the remaining number of bits R is calculated as follows:

```
if (Scene_change!=0) {
    tmp = (4+2N_p+(N_b-1)) × ux;
    sdiff = R-tmp;
    R = tmp;
    SavedBits += sdiff,
}
```

Parameters sdff and SavedBits may have negative values. However, If SavedBits is negative, the new GOP borrows bits from a future GOP.

Minimal Bits Size Unit

The minimal bits size unit, ux, used in equation (4.1) above, is defined as follows:

$$ux = R/(c_i + c_p N_p + c_b N_b) \quad (5.1)$$

In equation (5.1), R is the total number of bits allocated for encoding the frames of a GOP as defined in equations (1.5) and (1.6), and $N_p$ and $N_b$ are the number of P frames and B frames in the GOP, respectively. Parameters $c_i$, $c_p$ and $C_b$ represent the relative number of bits required in encoding I, P and B frames and have the respective default values of 4, 2 and 1.

As seen from equation (5.1), in accordance with one aspect of the present invention, ux and thus, for example, parameter BankLimit (see equation (4.1)), are directly related to the bit rate R. Therefore, if R increases ux increases and if R decreases ux decreases. Moreover, to the extent that ux and thus, for example, parameter BankLin7it, are also related (i.e., inversely) to parameters $c_i$, $c_p$, $c_b$, $N_p$ and $N_b$, ux is a weighted function of the number of bits adapted to encode I, B and P frame types.

In accordance with these default values, an I frame is adapted to use twice as many iix bits as a P frame and four times as many ux bits as a B frame. The above default values may be modified as more statistics about the number of bits required to encode each frame types of previous GOPs are collected.

Improved Target Bits

There may be instances where the target bit, as defined by the $TM_5$ standard and shown in equation (2.3) above, may be too large, thereby wasting bits. To prevent this, maximum target limitations are set for $T_{itm5}$, $T_{ptm5}$ and $T_{btm5}$ as shown below:

If $(T_{itm5} > M_i \times ux) T_{itm5} = M_i \times ux$

If $(T_{ptm5} > M_p \times ux) T_{ptm5} = M_p \times ux$

If $(T_{btm5} > M_b \times ux) T_{htm5} = M_b \times ux$

Furthermore, the minimum target bit size $T_{min}$ is set equal to ux. Therefore, in accordance with one aspect of the present invention, a lower limit and an upper limit is set for each of the $T_{itm5}$, $T_{ptm5}$ nad $T_{btm5}$ and $T_{btm5}$ parameters. In some embodiments $M_i$, $M_p$ and $M_b$ are respectively set to 6, 5 and 4.

Figure 3:
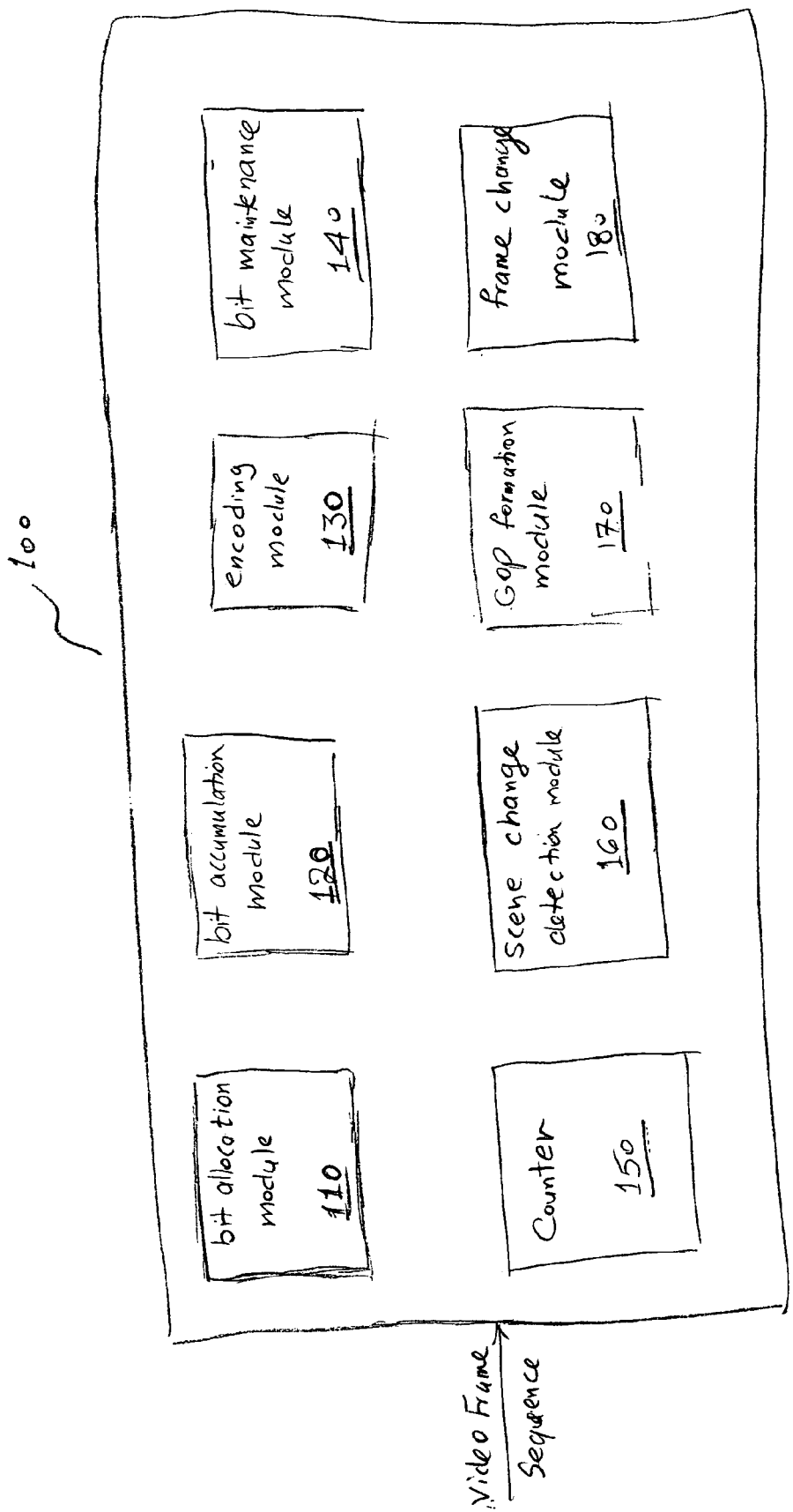
FIG. 3 is a simplified high-level block diagram of a video encoding system in accordance with the present invention.

FIG. 3 is a simplified high-level block diagram of a video encoding system 100 adapted to encode a sequence of video frames forming GOPs in accordance with the present invention. Video encoding system 100 is shown as including a bit allocation module 110, a bit accumulation module 120, an encoding module 130, a bit maintenance module 140, a counter 150, a scene change detection module 160, a GOP formation module 180, and a frame change module 180. Bit allocation module 110 is adapted to allocate a number of bits for encoding the frames of a frame sequence of a first GOP received by video encoding system 100. Bit accumulation module 120 is adapted to accumulate a multitude of bits defined by a difference between the allocated number of bits for at least one of the frames in the received frame sequence and a first threshold value. Some of the frames in the frame sequence is encoded by encoding module 130 using a portion of the accumulated bits. Encoding module 130 is further adapted to encode some frames in a frame sequence of a second GOP using the bits accumulated by bit accumulation module 120 from the frames of the first GOP. Bit maintenance module 140 is adapted to maintain the accumulated bits at a level equal to a second threshold value. Counter 150 is adapted to maintain a count of the accumulated bits in bit accumulation module 120. Scene change detection module 160 is adapted to determine whether a P frame of the frame sequence in each GOP includes a scene change frame. GOP formation module 170 is adapted to form a second GOP that includes the P frame and the unencoded frames of the first GOP. Frame change module 180 is further adapted to encode the scene change P frame of the first GOP as an I frame in the second GOP.

Improved Frame Level Rate Control

In accordance with one aspect of the present invention, enhanced global complexity measures $X_i$, $X_p$ and $X_b$ are provided to improve the frame level rate control. These enhanced global complexity measures $X_i$, $X_p$ and $X_b$ which are defined below, are for example, adapted for encoding Video sequence in accordance with the MPEG-4 standard.

$$X_i = (cx_i \times \text{bit\_rate}) + 0.5$$

$$X_p = (cx_p \times \text{bit\_rate}) + 0.5 \quad (6.1)$$

$$X_b = (cx_b \times \text{bit\_rate}) + 0.5$$

Parameters $cx_i$, $cx_p$ and $cx_b$ are related to the complexity measurement values associated with frames types I, B and P respectively. Therefore, each of the frame types I, P and B has a different weight assigned to its associated global complexity measure before it is encoded. In other words, for example, global complexity measure $X_i$ is defined by a parameter (i.e., $cx_i$) that is different from the parameter defining enhanced global complexity measure $X_p$, etc.

As seen from equation (6.1), as the complexity of a frame $X_{i,p,b}$ increases, so does the frame's associated parameter $cx_{i,p,b}$. For example, if the complexity of an I-frame increases, parameter $cx_i$ associated with that I-frame also increases. Consequently, in accordance with this aspect of the present invention, for example, as the size or complexity of a sequence of video frames changes, the number of bits used to encode these video frame is modified to accommodate these changes. In one embodiment, $cx_i$, $cx_p$ and $cx_b$ are respectively set to 190/115, 70/115 and 52/115, however, these values change as more data on how the previous frames were encoded are gathered.

Improved Reaction Parameter

The reaction parameter r as defined by the $TM_5$ standard (see equation 2.2 above) is not related to the resolution. This may (1) degrade the video quality when small resolutions are used and (2) lead to bit rate target missing. Therefore, in accordance with one aspect of the present invention, a new parameter mr is defined as shown below:

$$mr = 2 \times \text{bit\_rate}/(3500 \times MB\_cnt)$$

where MB_cnt is the number of macro blocks disposed in the frame. The reaction parameter r, in turn, is dependent on parameter mr as shown by the following equation:

$$r = 2 \times mr \times \text{bit\_rate}/\text{picture\_rate}$$

As the size of a frame increases, the number of macro blocks in the frame and thus the frame resolution increases. Accordingly, because parameter mr is dependent on the frame resolution (i.e., via parameter MB_cnt), the reaction parameter r is also dependent on the frame resolution and, further, on the bit rate.

Improved Virtual Buffer Fullness

The initial buffer fullness parameters $d^i_0$, $d^b_0$ and $d^P_0$ defined by the $TM_5$ standard are reset to their default values (see equations (2.5) above) if they become zero. This may lead to degradation of the video quality. To rectify this problem, in accordance with one aspect of the present invention, initial buffer fullness parameters $d^i_0$, $d^P_0$ and $d^b_0$ (collectively referred to hereinbelow as $d^{i,p,b}_0$) are defined as below:

$$\text{if}(d^{i,p,b}_0 < 0)$$

$$d^{i,p,b}_0 = avg\_qp \times r/31$$

In other words a non-negative lower limit is set for $d^{i,p,b}_0$. Therefore, if any of the initial buffer fullness parameters becomes negative, it is set to 1/31 of the product of the average quantization parameters for all the macro blocks in the P frame and the reaction parameter. To the extent that the reaction parameter r is dependent on the frame resolution, as described above, $d^{i,p,b}_0$ is also dependent on the frame resolution.

Moreover, to ensure that $d^{i,p,b}_0$ does not become relatively too large—which may slow down the convergence of the rate control—an upper limit of r is set for $d^{i,p,b}_0$, as shown below:

$$\text{If}(d^{i,p,b}_0 > r)$$

$$d^{i,p,b}_0 = r$$

Therefore, in accordance with this aspect of the present invention, each initial buffer fullness parameters $d^{i,p,b}_0$ is defined by an upper limit, a lower limit and its associated frame resolution.

Improved Quantization Parameter

As seen from equation (3.5), the rate control as defined by the $TM_5$ only uses the normalized (spatial) activity measurement $N\_act_j$ to adjust the quantization parameter $mquant_j$ for the j-th macro block. This may result in motion artifacts (e.g., blocking effects) in the regions which are not adequately motion compensated. To reduce these artifacts, in accordance with one aspect of the present invention, the summed absolute difference (SAD) calculated in the motion estimation for the j-th macro block is used to adjust the value of $mquant_j$ for the P and B frames, as shown below when the macro block is inter-coded:

```
if (SAD!=0) {
    If (SAD > sad_up || SAD < sad_low)
        mquant_j = mquant_j × (q_sad_thrd/SAD),          (7.1)
}
```

Therefore, in accordance with (7.1), if SAD is between sad_up and sad_low, the quantization parameter $mquant_j$ is modified. If, on the other hand, SAD is greater than sad_up or smaller than sad_low, SAD is not modified; sad_up, sad_low and q_sad_thrd are initialized for the entire video sequence. In one embodiment, sad_up is between 1600 and 1800, sad_low is between 300 and 200 and q_sad_thrd is between 1600 and 1800 and $mquant_j$ is between 1 and 31.

The above embodiments of the present invention are illustrative and not limitative. For example, the invention is not limited by the programmable threshold value above which allocated bits are accumulated in the bit bank. The invention is not limited by the method or system used to keep track of the number of bits accumulated in the bit bank. For example, in some embodiments a counter keeps track of the number of accumulated bits. The invention is not limited by the type of hardware or software adapted to perform the above inventions. Furthermore, it is understood that the above inventions may be performed by either software modules, hardware modules or a combination of both. Other variations, modifications, additions, deletions, and equivalents will be apparent to a person skilled in the art and are intended to fall within the scope of the appended claims.

What is claimed is:

1. A method for encoding a video sequence having disposed therein a plurality of frames, the method comprising:
    allocating a number of bits for encoding each of the plurality of frames disposed in the video sequence;
    selecting a first threshold value;
    accumulating a plurality of bits defined by a difference between the allocated number of bits for at least one of the plurality of frames and the first threshold value;
    encoding another one of the plurality of frames using at least a portion of the accumulated bits, wherein the plurality of frames is representative of a first group of pictures (GOP), wherein said first GOP comprises at least one frame selected from a group consisting of I-frame, P-frame, and B-frame;
    determining whether a P frame of the first GOP includes a scene change;
    forming a second GOP that includes the P frame and unencoded frames of the first GOP;
    encoding the scene change P frame of the first GOP as an I frame in the second GOP; and
    changing a frame that is to be displayed after the I frame of the second GOP to a duplicate of the I frame of the second GOP.

2. The method of claim 1 wherein the at least a portion of the accumulated bits are used when a number of bits required to encode the other one of the plurality of frames exceeds the first threshold value.

3. The method of claim 1 wherein the other one of the plurality of frames is a scene change frame.

4. The method of claim 1 further comprising:
    maintaining the accumulated plurality of bits at a level equal to a second threshold value.

5. The method of claim 4 wherein said second threshold value is related to a variable that is defined by a total number of bits allocated for the frames of the first GOP.

6. The method of claim 5 wherein said variable is further defined by a weighted function of relative number of bits used to encode each of I, P and B frames of the first GOP.

7. The method of claim 1 wherein the first threshold value is selected in accordance with the at least one of the plurality of frames.

8. The method of claim 1 further comprising:
receiving the second GOP; and
encoding at least one of the frames of the second GOP using the bits accumulated from the frames of the first GOP.

9. The method of claim 1 wherein a count of the accumulated bits is maintained in a counter.

10. The method of claim 1 wherein the at least one of the plurality of frames not including a scene change.

11. A system for encoding a video sequence having disposed therein a plurality of frames, the system comprising:
a module for allocating a number of bits for encoding each of the plurality of frames disposed in the video sequence;
a module for accumulating a plurality of bits defined by a difference between the allocated number of bits for at least one of the plurality of frames and a first threshold value;
a module for encoding another one of the plurality of frames using at least a portion of the accumulated bits, wherein the plurality of frames is representative of a first group of pictures (GOP), wherein said first GOP comprises at least one frame selected from a group consisting of I-frame, P-frame, and B-frame;
a module for determining whether a P frame of the GOP includes a scene change;
a module for forming a second GOP that includes the P frame and unencoded frames of the first GOP;
a module for encoding the scene change P frame of the first GOP as an I frame in the second GOP; and
a module for changing a frame that is to be displayed after the I frame of the second GOP to a duplicate of the I frame of the second GOP.

12. The system of claim 11 wherein the at least a portion of the accumulated bits are used when a number of bits required to encode the other one of the plurality of frames exceeds the first threshold value.

13. The system of claim 11 wherein the other one of the plurality of frames is a scene change frame.

14. The system of claim 11 further comprising:
a module for maintaining the accumulated plurality of bits at a level equal to a second threshold value.

15. The system of claim 11 wherein the first threshold value is selected in accordance with the at least one of the plurality of frames.

16. The system of claim 11 further comprising:
a module for encoding at least one frame of the second GOP using the bits accumulated from the frames of the first GOP.

17. The system of claim 11 wherein each of the respective modules is one of a software module and a hardware module.

18. The system of claim 11 wherein each of the respective modules includes both software and hardware modules.

19. The system of claim 11 further comprising a counter for maintaining a count of the accumulated bits.

20. The system of claim 11 wherein the at least one of the plurality of frames not including a scene change.

* * * * *